No. 673,273. Patented Apr. 30, 1901.
C. LANGLOTZ, E. WINDSOR & W. H. HINES.
STAVE DRYING APPARATUS.
(Application filed Jan. 24, 1901.)
(No Model.)
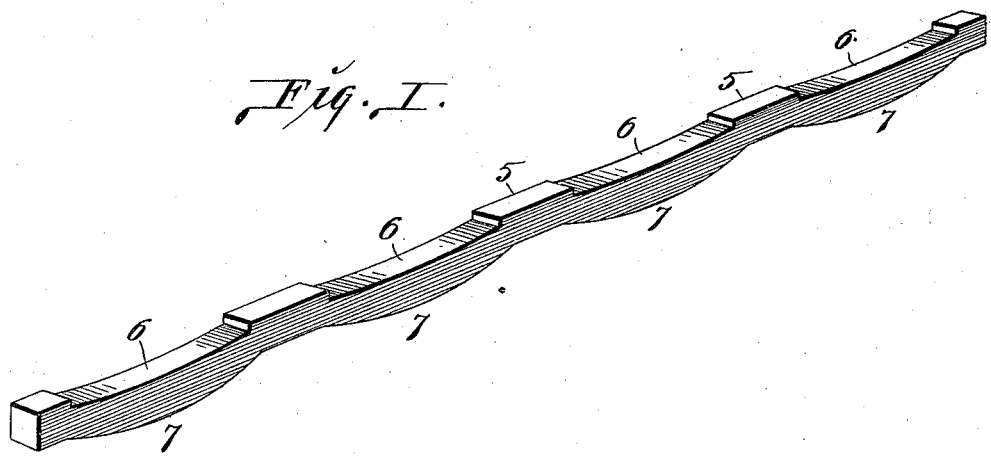
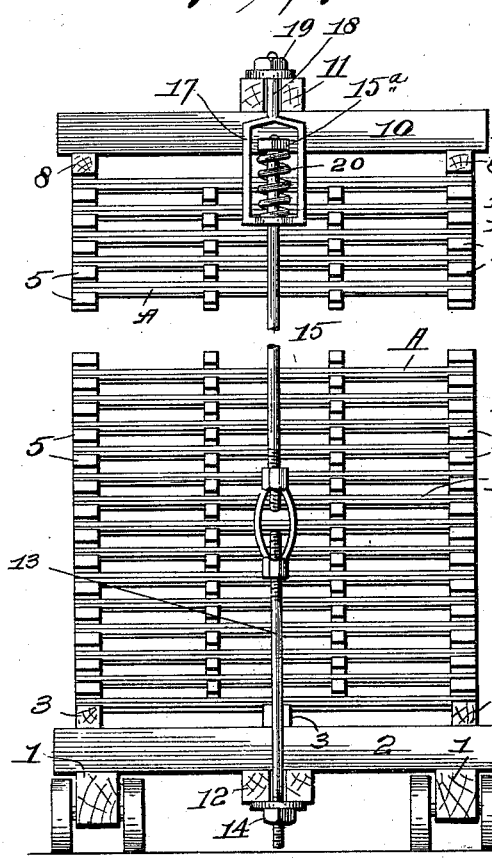
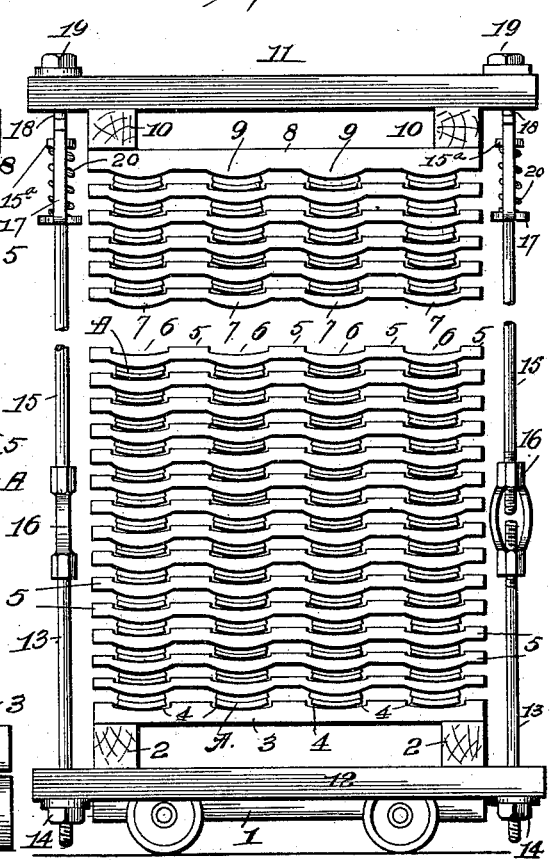
Inventors: Charles Langlotz, Elijah Windsor, and Warren H. Hines.

UNITED STATES PATENT OFFICE.

CHARLES LANGLOTZ, OF NEW YORK, N. Y., AND ELIJAH WINDSOR AND WARREN H. HINES, OF POPLARBLUFF, MISSOURI, ASSIGNORS TO LOWELL M. PALMER, OF NEW YORK, N. Y.

STAVE-DRYING APPARATUS.

SPECIFICATION forming part of Letters Patent No. 673,273, dated April 30, 1901.

Application filed January 24, 1901. Serial No. 44,495. (No model.)

*To all whom it may concern:*

Be it known that we, CHARLES LANGLOTZ, a citizen of the United States, residing at the city of New York, in the State of New York, and ELIJAH WINDSOR, a subject of the Queen of Great Britain, and WARREN H. HINES, a citizen of the United States, both residing at Poplarbluff, in the county of Butler and State of Missouri, have invented certain new and useful Improvements in Stave-Drying Apparatus, of which the following is a full, clear, and exact description, reference being had to the accompanying drawings, forming part of this specification.

Our invention relates to an apparatus for use in holding barrel-staves under pressure during the process of drying them in a kiln.

Our invention consists in features of novelty hereinafter fully described, and pointed out in the claims.

Figure I is a perspective view of one of the piling sticks or separators utilized in the apparatus. Fig. II is a view in side elevation, showing the apparatus with pressure applied thereto. Fig. III is a view in end elevation, showing the apparatus before pressure is applied.

1 designates trucks on which the apparatus is supported in moving it to and from the kiln. Mounted on the trucks are sills 2, that receive and support the foundation piling-sticks 3. These piling-sticks 3 are provided with concave pockets 4, that receive the lower staves A, placed thereon in pairs. Above the first series of staves is positioned one of a series of piling or separating sticks 5, these sticks each in turn receiving series of staves arranged in pairs, the piling of the staves being continued to the desired height, with a piling-stick alternating between each pair of staves and the staves being arranged in tiers from bottom to top of the apparatus. Each of the piling or separating sticks is provided at one side with concave pockets 6 and at the opposite side with convex projections 7, the curvature of the convex portions being of a greater degree (or less radius) than the curvature of the pockets, for a reason to be hereinafter explained.

Surmounting the topmost series of staves of the tiers are crowning-sticks 8, having convex projections 9, that fit against the top staves. Placed upon the crowning-sticks 8 are timbers 10, that are surmounted by a cross-beam 11. The cross-beam 11 is joined to a cross-beam 12, located beneath the sills 2 by means through which pressure may be exerted upon the staves piled in the apparatus and which will next be described.

13 designates connecting-rods provided with nuts 14 and seated in the ends of the cross-beam 12. The upper ends of the connecting-rods 13 are joined to connecting-rods 15 by turnbuckles 16. The upper ends of the connecting-rods 15 are loosely seated in yokes 17 and are provided with nuts 15$^a$. The yokes 17 are provided with shanks 18, that are seated in the ends of the cross-beam 11 and are equipped with nuts 19. Surrounding the connecting-rods 15 between the bottoms of the yokes 17 and the nuts 15$^a$ on the connecting-rods are springs 20.

In applying pressure to the staves (after piling them as described and putting the cross-beam in position and joining them by the connecting-rods and yokes) the nuts 19 are tightened on the yoke-shanks 18, and the cross-beams 11 and 12 are thereby drawn toward each other, thus binding the staves between the piling or separating sticks 5 between the pockets 6 and convex projections of the piling-sticks. In thus confining the staves they are caused to fill the spaces between the pockets and projections when first placed in the apparatus in their green and undried condition previous to the shrinkage that naturally occurs in drying them; but as the staves dry and shrinkage takes place such shrinkage must necessarily be compensated for and is compensated for by the springs 20, which expand immediately upon the occurrence of such shrinkage and cause the cross-beams 11 and 12 to be still further drawn toward each other to maintain uniform pressure upon the staves.

The staves are placed in the apparatus in pairs in order to economize space and effect the drying of large numbers of staves with the greatest rapidity, and practical experience has demonstrated to us that in so arranging the staves in pairs throughout the apparatus it is essential, in order to produce staves of uniform shape when dried, that one stave receive the pressure of the piling or separating stick differently from the other stave. To effect this, experience has proved that the curvature of the convex projections on one side of each piling-stick must vary from the curvature of the pockets in which the staves are laid, and we therefore provide the convex projections 7 with a greater degree of curvature than the curvature of the pockets 6. The reason that this difference in curvature of the pockets and convex projections is rendered necessary lies in the fact that the convex projections effect a spreading action against the topmost staves of each pair, whereas the convex pockets 6 effect a hugging action against the lowermost staves. It is therefore imperative that the curvature of the projections and pockets be unequal in order that, on the shrinkage of the staves, the difference between the spreading action against one stave and the hugging action against the other stave may be compensated for, and the action at the two sides of the pair of staves be equalized, and the staves in each pair be of uniform shape when dried.

We claim as our invention—

1. In a stave-drying apparatus, the combination of a framework within which the staves are piled in tiers and arranged in series of pairs, separating or piling sticks located between said series of pairs of staves; means for effecting pressure upon said staves; said sticks having concave pockets and convex portions of different radii, substantially as described.

2. In a stave-drying apparatus, the combination of a framework within which the staves are piled in tiers and arranged in series of pairs, separating or piling sticks located between said series of pairs of staves, means for effecting pressure upon said staves; said sticks having concave pockets and convex projections, said pockets and projections having varying degrees of curvature, substantially as described.

3. In a stave-drying apparatus, the combination of a framework within which the staves are piled in tiers and arranged in series of pairs, separating or piling sticks located between said series of pairs of staves, means for effecting pressure upon said staves; said sticks having concave pockets and convex projections, the curvature of said projections being of greater degree than the curvature of said pockets, substantially as described.

4. In a stave-drying apparatus, the combination of a framework within which the staves are piled in tiers and arranged in series of pairs, separating or piling sticks located between said series of pairs of staves, means for effecting pressure upon said staves, and compensating springs arranged in said pressure means, substantially as described.

5. In a stave-drying apparatus, the combination of a framework within which the staves are piled in tiers and arranged in series of pairs, separating or piling sticks located between said series of pairs of staves, cross-beams arranged above and beneath said framework, connecting-rods and turnbuckles applied to said beams, yokes connected to said beams and said rods, and compensating springs applied to said rods within said yokes, substantially as described.

CHARLES LANGLOTZ.
    ELIJAH WINDSOR.
    WARREN H. HINES.

In presence of—
 GEO. WINDSOR,
 J. R. HALL.